United States Patent Office 3,658,891
Patented Apr. 25, 1972

3,658,891
METHOD FOR SYNTHESIZING MALEOPIMARIC ACID
George Gonis, Valdosta, Ga., and Frank B. Slezak, Trenton, N.J., assignors to Union Camp Corporation, Wayne, N.J.
No Drawing. Continuation-in-part of abandoned application Ser. No. 719,745, Apr. 8, 1968. This application July 28, 1970, Ser. No. 59,006
Int. Cl. C07c 51/00; C09f 1/00
U.S. Cl. 260—514.5   7 Claims

ABSTRACT OF THE DISCLOSURE

A crystalline complex in the form of a maleopimaric acid-acetic acid molecular complex in which 1 mole of maleopimaric acid and 1 mole of acetic acid make up the complex. This complex is crystallized from the reaction mixture of maleic anhydride and rosin in glacial acetic acid which may contain up to 20% of water and which has been heated to at least 118° C. for at least 2 hours, after which the acetic acid is removed to produce a medium containing 75–150 ml. of acetic acid for each 100 grams of rosin. Pure maleopimaric acid is obtained by heating the complex under vacuum to remove the acetic acid.

---

This is a continuation-in-part application of application Ser. No. 719,745, filed Apr. 8, 1968 now abandoned.

This invention relates to a new method for the synthesis of maleopimaric acid by reacting maleic anhydride and commercial grade rosin in glacial acetic acid which may contain up to 20% of water at reflux temperatures or higher and includes new steps of purification of the product in crystalline form. After reaction at about 118° C. at atmospheric pressure, the reflux temperature of glacial acetic acid reaction medium, and after cooling, the product of addition which crystallizes from the reaction mixture is in the form a maleopimaric acid-acetic acid molecular complex in which 1 mole of maleopimaric acid and one mole of acetic acid make up the complex. This crystalline complex is soluble to a certain extent in the glacial acetic acid, and the acetic acid medium is evaporated in known manner to adjust the volume for the best conditions of crystallization.

This new method of the invention is simpler to carry out than the methods previously reported in the literature and represents a commercially practical method because it starts from commercial grade rosin and affords high yields of very pure crystalline product in the form of the acetic acid complex or solvate. This solvate is readily converted to the non-solvated form of maleopimaric acid by simply heating to drive off the acetic acid.

By way of example, the starting rosin may be either a wood rosin or a tall oil rosin which generally contains at least about 50% abietic and abietic-type acids. After driving off the acetic acid from the recovered solvate, yields are achieved of about 27% of pure maleopimaric acid (freed from acetic acid) based on the actual weight of commercial grade rosin used. Scale-up of the method of the present invention from laboratory amounts of 100 grams of rosin to over a kilo shows that comparable yields of about 54%' of solvate and about 27% of pure acid are obtained. If the starting rosin is tall oil rosin, one which is manufactured under the name Unitol ROS is available from Union Camp Corporation, it has the following characteristics:

Rosin acids: 94.8%
Fatty acids: 2.6%
Unsaponifiables: 2.6%
Acid number: 170
Saponification number: 177
Softening point (ring and ball): 80° C.

Other rosins which may be used are listed in the table below:

TYPICAL CHARACTERISTICS OF ROSINS USED

| Property | Tall oil rosin | Wood rosin | Gum rosin | High acid No. tall oil rosin [a] |
|---|---|---|---|---|
| Rosin acids, percent | 93–95 | 88–90 | 90–91 | 95 |
| Fatty acids, percent | 2.6–3.2 | | | 2.9 |
| Unsaponifiables, percent | 2.6–3.8 | 10–12 | 8.8–9.0 | 2.5 |
| Acid number | 166–178 | 163 | 160–161 | 176 |
| Saponification number | 173–180 | 167–168 | 168–171 | 180 |
| Softening point, ° C | [b] 79–81 | [c] 85 | [b] 71–75 | [b] 80 |

[a] High acid tall oil resin types.
[b] Ring and ball method.
[c] Hercules drop softening point.

An important advantage of the present commercial method is based upon carrying out the reaction at atmospheric pressure for a time period of 8–24 hours under conditions which require a minimum amount of personal supervision by skilled chemists or technicians. The reaction of the present invention, when carried out at a temperatures higher than 118° C., the reflux temperature of acetic acid, and under pressure in an autoclave at 175–195° C. and 150–200 p.s.i., permits the time of reaction to be considerably reduced to about 2–6 hours; but the yield and purity suffer and very careful control by skilled personnel is required. Instead of filtering a pure crystalline product, an impure product is isolated from the autoclave reaction and appears to be a mixture containing by-products which result from secondary reactions at the elevated temperatures. Solvent purification of this impure product results in a recovery of maleopimaric acid and a modified rosin which differs from the starting material. The reaction of the present invention carried out at atmospheric pressure results in a recovery of a substantial amount of unreacted rosin which contains amounts of dehydroabietic acid similar to that in the starting rosin while, in contrast, the by-product modified rosin from the autoclave reaction has a higher softening point than the original rosin and is much darker in color. The reaction at atmospheric pressure is easier to carry out and is preferred to the reaction in an autoclave at higher temperatures and superatmospheric pressure since it gives a better product.

The method of the present invention cannot be applied to commercial grade tall oil rosin and fumaric acid to produce fumaric acid adduct. All attempts which have been made to obtain the fumaric adduct at atmospheric pressure or in an autoclave have failed.

PRIOR ART

The Diels-Alder reaction of rosin acids with maleic anhydride is well known and has been reported by L. Ruzicka, P. J. Ankersmit and B. Frank in Helv. Chim. Acta 15, 1289 (1932) and in Fleck U.S. Pat. No. 2,359,980 and Harris U.S. Pat. No. 2,447,750. The reaction originally used to demonstrate the presence of two conjugated double bonds in rosin acids treats abietic as well as levopimaric acid with maleic anhydride. These starting acids give identical products. However, the U.S. patents to Fleck and Harris above emphasize that the products of reaction are not satisfactory when based upon commercial grade tall rosin because they have poor stability in sunlight and break down under high temperature cooking conditions in the varnish manufacturing process. Fleck and Harris emphasize that only when pure starting materials are employed are the stability deficiencies overcome and they stress that the highest requirement for purity is in the preparation of the starting material, e.g., the levopimaric acid. To meet this purity requirement renders the method of manufacture an expensive laboratory procedure without any commercial potential.

The present invention produces pure maleopimaric acid from any commercial grade rosin as starting material and from mixtures, these rosins being tall oil rosin, wood rosin or gum rosin. The method of the present invention eliminates solvent purification procedures, such as crystallization from carbon tetrachloride as in Lawrence et al. U.S. Pat. No. 2,628,226, or crystallization from hexane solvent as in Cox U.S. Pat. No. 2,409,930, or crystallization from chloroform as in Halbrook et al. U.S. Pat. No. 2,889,362, or crystallization from toluene, tetralin or butyl acetate as in Humphrey U.S. Pat. No. 2,072,819. A mixed solvent medium has been used, such as the method of Lawrence et al. above, which carries out the Diels-Alder addition reaction of pine oleoresin and maleic anhydride in isooctane-acetone solution from which the product crystallizes after the reaction mixture stands at room temperature overnight. Purification of the Diels-Alder adduct is effected via the complex formed with carbon tetrachloride. The pure adduct is obtained by thermal decomposition of the complex. This method cannot be used with commercial grade pine, wood, gum or tall oil rosin. Attempts to prepare the adduct in this way from other resin acids, e.g. for palustric see V. M. Loeblich, D. E. Baldwin and R. V. Lawrence, J. Am. Chem. Soc. 77, 2823 (1955), have met with failure.

Maleopimaric acid has also been prepared from wood rosin by carrying out the reaction in benzene saturated with hydrogen chloride, as in the A.B. Anderson article in TAPPI 37, 316-20 (1954), but the solution is heated at reflux for 50 hours and the workup is very lengthy and involved. This Anderson process is, therefore, not attractive on a commercial basis.

Reactions of rosin and maleic anhydride in the molten state lead to impure products. See, for example, Example 1 of Halbrook et al. U.S. Pat. No. 2,889,362 where the melt temperature is about 200° C. for several hours, and Koonce U.S. Pat. No. 2,538,103 where a temperature of 200-210° C. is shown for a time of 3-20 hours. In Koonce, purification requires distillation in a molecular still. Removal of the adduct from the reaction mixture in Halbrook et al. or Koonce is very difficult and cannot be carried out in the usual commercial equipment. Nevertheless, the impure maleopimaric acid in the Halbrook et al. or Koonce process is very desirable commercially and has found extensive use in paper size and coatings. A great deal of work has been done in the prior art to develop better products. See A. G. Hovey and T. S. Hodgins, Ind. & Eng. Chem. 32, 272 (1940). However, these attempts have not heretofore resulted in the manufacture of pure maleopimaric acid.

OBJECTS OF THE INVENTION

An object of the invention is to provide a method for the commercial manufacture of high quality maleopimaric acid by reacting maleic anhydride and commercial grade rosin in glacial acetic acid to form a crystalline product in the form of a molecular complex in which one mole of maleopimaric acid and one mole of acetic acid make up the complex.

A further object of the invention is to prepare pure maleopimaric acid from the crystalline maleopimaric acid-acetic acid molecular complex by heating to drive off the acetic acid.

A further object is to provide a simple commercial method of preparing maleopimaric acid by reacting maleic anhydride and commercial grade tall oil rosin in glacial acetic acid at atmospheric pressure and at the reflux temperature of glacial acetic acid, e.g. 118° C., for a reaction period of about 8-24 hours.

Another object of the invention is to prepare maleopimaric acid by reacting maleic anhydride and commercial grade tall oil rosin in glacial acetic acid under pressure in an autoclave at 175-195° C. and 150-200 p.s.i. for a period of from 2-6 hours.

Other and further objects and advantages of the invention will be more fully understood from the following examples which are illustrative of the invention.

EXAMPLE 1

(A) Preparation of maleopimaric acid-acetic acid solvate

An amount of 100 grams of commercial grade rosin and 16.3 grams of maleic anhydride were dissolved in 1,000 ml. of glacial acetic acid and the reaction mixture was heated at reflux temperature (118° C.) overnight (22 hours) and thereafter the solvent was stirpped. The residue did not crystallize from hydrocarbon solvents, such as benzene, petroleum ether, hexane, etc. and more polar solvents, such as alcohols, were not suitable for crystallization because the products and reactants were completely dissolved. The residue was dissolved in a minimum amount of hot glacial acetic acid and the solution was cooled slowly overnight to recover crystals of maleopimaric acid complexed with acetic acid on a 1:1 mole basis in pure form. The crystalline material so recovered had $[\alpha]_D = -27°$ and melting point 226-227° which agrees with the literature.

This general procedure was carried out for the four commercial samples shown in Table 1 below with the recovery and yield values shown therein. These samples were made by partial stripping of the glacial acetic acid followed by crystallization.

TABLE 1.—YIELDS OF MALEOPIMARIC ACID FROM VARIOUS ROSINS

| Rosin (100 g. samples) | Grams of adduct (air dried) | Percent yield (based on 50% active ingredient in the rosin) |
|---|---|---|
| Tall oil (Unitol ROS) | 43.4 | 51.6 |
| High acid No. tall oil rosin | 40.0 | 52.3 |
| Ordinary gum | 20.0 | 26.1 |
| Wood | 51.5 | 67.2 |

To verify the above yields and to confirm the 50% active ingredient value present in the rosin, maleopimaric acid was prepared from a sample of pure abietic acid. Ten grams of abietic acid ($[\alpha]_D = -100°$) and six grams of maleic anhydride were heated at reflux in 75 ml. of glacial acetic acid for 22 hours. Stripping of 50 ml. of solvent and cooling of the reaction mixture gave 8.7 grams of solvated product which represents a yield of 55.5% of theory based upon the values in Table 1.

Further runs were made in which the residue was not taken up in hot glacial acetic acid. Glacial acetic is the reaction medium and the solvent for crystallization and in these further runs, the product was merely allowed to crystallize from the solution after solvent evaporation and concentration of the reaction mixture to a small volume of 50-75 ml. This procedure eliminates a major step carried out in the earlier runs. Rosin from the residue was then recovered from the acetic acid filtrate by heating under vacuum on a rotary evaporator.

(B) Removal of solvated acetic acid to recover pure maleopimaric acid

The acetic acid solvate undergoes a transition to the non-solvated form at 110-135° C. whereby the acetic acid of solvation is removed by heating at or above the transition temperature at reduced pressure. When aqueous acetic acid (less than 50% acetic acid) is used as a solvent, the hydrate of maleopimaric acid is obtained. In either case, using glacial acetic acid or aqueous acetic acid, the final melting point of the desolvated product is the same.

It was preferred to recover pure non-solvated maleopimaric acid by heating the acetic acid solvate in a vacuum oven at 30" vacuum and 145-150° C. for at least eight hours. Alternatively, the hydrate of maleopimaric acid may be prepared by crystallization of the acetic acid solvate from aqueous acetic acid and this product may be heated under vacuum in order to drive off the water.

The purity and composition of samples of the maleopimaric acid solvate made by the process of this example of the invention were verified by determination of neutral equivalents using standard base. The titrations were carried out in 70% aqueous acetone. When alcoholic potassium hydroxide was used as titrant, neutral equivalents corresponding to one less carboxyl group were observed. This result was due to formation of the half-ester of the anhydride.

Use of aqueous base gave the results which are shown in Table 2 below, no ester formation being possible.

TABLE 2.—NEUTRAL EQUIVALENTS OF MALEOPIMARIC ACID

| Compound | Titrant | N.E. found | Calc. N.E. | M.W. theory |
|---|---|---|---|---|
| HOAc solvate | KOH—$C_2H_5$OH | 153 | 153 | 460 |
| Do | KOH—$H_2$O | | 115 | 460 |
| Non-solvated | KOH—$C_2H_5$OH | 198 | 100 | 400 |
| Do | KOH—$H_2$O | 133 | 133 | 400 |
| Hydrate | KOH—$H_2$O | 138 | 139 | 418 |

The neutral equivalents show that the solvate forms in a 1:1 molar ratio. The equivalent weight of the hydrate also corresponded to the presence of one mole of water. Maleopimaric acid titrates as a dicarboxylic acid rather than a tricarboxylic acid when alcoholic base is used.

(C) Optimum conditions for crystallizing adduct

It has already been pointed out that 50% of the rosin consists of the conjugated dienoic acids which react with maleic anhydride, that is, abietic, neoabietic or palustric acids. After the reaction mixture has run for the desired length of time, e.g. 8–24 hours at atmospheric pressure or 2–6 hours at superatmospheric pressure in an autoclave at 175–195° C. and 150–200 p.s.i., sufficient acetic acid was removed to leave about 125 ml. of acetic acid for each 100 grams of rosin used in the reaction mixture. If the solution were concentrated more, its viscosity when cooled would be so great as to create difficulties during filtration of the product. If less acetic acid were removed, a low yield of maleopimaric acid would have been obtained. On standing overnight at room temperature, the maleopimaric acid crystallized from the solution in the form of large prisms. The product was easily filtered. The small laboratory runs were filtered and the crystals were washed with small amounts of cold, fresh acetic acid. It was advantageous to induce crystallization by seeding the concentrated cooled reaction mixture. Cooling in an ice bath was of no advantage in effecting more complete crystallization because the solution became too viscous.

(D) Recovery of rosinous residue

The rosinous residue was recovered from the filtrate and washings followed separation of the maleopimaric acid solvate. Stripping the filtrate of rosin was carried out on a rotary evaporator. When almost all of the acetic acid was removed, the rosin was fused under vacuum by heating the flask with a Bunsen burner, the last traces of solvent being distilled and the molten residue being poured out into an aluminum dish where it was hardened.

This same procedure was used in preparing the adduct from Unitol ROS, tall oil rosin, high acid tall oil rosin, gum rosin and WW wood rosin, as set forth in the first table herein.

EXAMPLE 2

Effect of the amount of solvent used

A series of reactions were carried out in order to determine the effect of the amount of solvent on the reaction. In each case, a 200 gram sample of Unitol ROS and 65.0 grams of maleic anhydride were allowed to react over a period of 22 hours. After this time, all but 200 ml. of acetic acid was stripped and the remaining solution was allowed to crystallize. The results are shown in Table 3 below. The yields are calculated using the assumption that the rosin contains 50% of properly conjugated dienoic acids. On this basis, a two-fold excess of maleic anhydride was employed.

TABLE 3.—YIELD OF MALEOPIMARIC ACID AS FUNCTION OF CONCENTRATION OF REACTANTS

| Acetic acid (ml.) | Grams of solvated product | Percent yield (solvated) |
|---|---|---|
| 200 | 50.0 | 37.5 |
| 250 | 65.5 | 49.0 |
| 1,000 | 72.2 | 51.5 |
| 1,500 | 84.5 | 63.3 |

It can be seen that at higher dilutions, the yield of product increases. In some cases, the product was obtained in more than one crop. The yields are based on the air-dried product.

EXAMPLE 3

Variables of concentration, amount of maleic anhydride and time of reaction

This example, consisting of 27 runs, was carried out in order to study the effects of the variables of concentration, time and amount of maleic anhydride. All combinations of the three variables were tested in separate reactions. No replicates were carried out. The times chosen for the reaction were 11, 22 and 44 hours. One hundred gram samples of rosin were run in 1000, 375 and 125 ml. of glacial acetic acid. The amount of maleic anhydride used was also varied. The data collected for the 27 runs are shown in Table 4. The data are given in grams of air-dried, solvated maleopimaric acid. In each case, all but 125 ml. of solvent was stripped off.

TABLE 4.—YIELDS OF MALEOPIMARIC ACID AS A FUNCTION OF THREE VARIABLES

| | I | | | II | | | III | | |
|---|---|---|---|---|---|---|---|---|---|
| | 1 | 2 | 3 | 1 | 2 | 3 | 1 | 2 | 3 |
| A | 36.75 | 38.85 | 38.83 | 38.00 | 41.06 | 44.05 | 36.50 | 40.04 | 44.45 |
| B | 39.60 | 40.27 | 43.22 | 37.45 | 42.64 | 46.59 | 44.00 | 44.20 | 46.38 |
| C | 35.20 | 43.56 | 45.90 | 35.45 | 43.43 | 43.34 | 39.40 | 42.00 | 47.74 |

| Solvent, ml. | Reaction time, hours | Maleic anhydride, grams |
|---|---|---|
| A, 125 | 1–11 | I, 14.7 |
| B, 375 | 2–22 | II, 16.3 |
| C, 1,000 | 3–44 | III, 20.4 |

NOTE.—All samples, 100 grams of Unitol ROS rosin.

The product was allowed to crystallize from the solution overnight in the usual manner. Statistical analysis of the results by the method of analysis of variance showed that the effect of reaction time was greatest. The amount of solvent and amount of maleic anhydride were of lesser significance.

EXAMPLE 4

Scale-up of the reaction

In order to prepare larger amounts of maleopimaric acid and to observe the effect of scaling-up the reaction, batches of the adduct were made in 5- and 12-liter flasks. During one run using a 12-liter flask, the volume of acetic acid recovered was carefully measured and it was found that the loss of solvent was 2.5%. The acetic acid of solvation was included as part of the recovered solvent. All of these large runs were carried out for 22 hours. The 12-liter runs contained 1200 grams of Unitol ROS rosin, 9 liters of glacial acetic acid and 210 grams of maleic anhydride. The 5-liter runs used 500 grams of rosin and the same proportions of solvent and anhydride. The reproducibility was fairly good, as can be seen in Table 5 below. The purity of the product was good, the melting point being 226–227° (plus or minus 1°) in each case.

TABLE 5.—YIELDS OF MALEOPIMARIC ACID FROM LARGE-SCALE RUNS

| ROS (grams) | Air-dried solvated adduct (grams) | Percent yield |
| --- | --- | --- |
| 500 | 226 | 59.0 |
| 500 | 240 | 62.7 |
| 500 | 242 | 63.2 |
| 500 | 234 | 61.0 |
| 500 | 249 | 65.0 |
| 1,200 | 615 | 66.8 |
| 1,200 | 585 | 63.6 |
| 1,200 | 600 | 65.3 |

EXAMPLE 5

Effect of sulfuric acid catalyst and of other solvent systems

In order to determine whether or not the presence of a strong acid catalyst would affect the rate or yield of the Diels-Alder reaction, two reactions were run in the presence of sulfuric acid. Two 100 gram samples of ROS rosin, each in 1 liter of glacial acetic acid containing 16.3 grams of maleic anhydride and 1 ml. of concentrated sulfuric acid, were refluxed for 7 and 15 hours respectively. The yield of product was 24.5 grams and 32.25 grams (air-dried solvated material) in each case respectively. This corresponds to a yield of 32% for the 7 hour reaction time and of 42% for the 15 hour time. The presence of sulfuric acid did not increase the rate of reaction and did not increase the yield of product. The disadvantage of using a mineral acid, such as sulfuric, is that it must be removed thereafter.

Other organic acid solvents were tried to see if they were effective as the medium for the reaction of commercial rosin with maleic anhydride. It was found that 90% formic acid was inoperative and was not a solvent for the rosin. Propionic acid was inoperative as a solvent. No product could be obtained on concentration and cooling of the reaction mixture containing propionic acid solvent. Had any product been formed in the propionic acid solvent, it should have separated readily from the solution since maleopimaric acid is insoluble in this solvent.

EXAMPLE 6

Effect of pressure

This is an example of the synthesis of maleopimaric acid in an autoclave. A 100 gram sample of ROS rosin and 16.3 grams of maleic anhydride were dissolved in 1 liter of acetic acid and the solution was heated in a type 316 stainless steel (Parr series 4500) pressure reaction apparatus for 2 hours between 175 and 195° C. with constant stirring. At the start of the reaction, a nitrogen atmosphere was introduced and during the reaction the pressure varied between 150 and 200 p.s.i. The reaction mixture was worked up in the usual manner and 39.4 grams of product was obtained (51.5%). This material had a melting point of 216–224° C. which is low compared to the 226–227° C. normally observed for the desired product. The results of this experiment were somewhat encouraging although the product obtained had a poor color and a lower melting point than usually observed. The yield was quite high considering the short reaction time (2 hours against 8–11 hours at atmospheric pressure).

EXAMPLE 7

This example characterizes the rosinous residue recovered from the commercial tall oil rosin runs of Example 1. The modified rosin obtained from tall oil rosin as described herein probably contains either unreacted maleic anhydride or some maleopimaric acid which may not have crystallized or, most likely, both of these. The modified rosin also contains almost no abietic, palustric or neoabietic acids and the major rosin acid should be dehydroabietic.

Gas chromatography analysis of a typical "modified" rosin residue sample was carried out and showed a throughput of about 50% as compared to about 87% for Unitol ROS. The predominant compound proved to be dehydroabietic acid as expected (22%). The low throughput of these residual rosins may indicate the presence of maleopimaric acid but it is quite likely that this is due mostly to the "non-volatiles" present which have been carried along and should be present in the residual rosin in a proportionately greater amount.

The softening point of the residual rosin was measured on a number of random samples by the ring and ball method and was found to lie in the range of 95–100° C. This is somewhat higher than the ring and ball softening point of Unitol ROS which is about 83° C.

EFFECT OF ACETIC ACID VOLUME

The essential condition for adjusting the volume of the acetic acid after reaction to provide the proper solids concentration for crystallizing the maleopimaric acid-acetic acid complex is achieved by removing the acetic acid from the reaction medium (see Examples 1B, 1C and 2 herein) so that there are from 75–150 ml. of acetic acid per 100 grams of rosin starting material. The rosin is commercial rosin and no correction for the rosin purity is needed in order to achieve this essential condition.

EFFECT OF WATER IN GLACIAL ACETIC ACID MEDIUM

It has been shown in Example 2 that 125 ml. of glacial acetic acid per 100 g. of rosin was the optimum volume for crystallization of the maleopimaric acid. Reactions carried out in larger volumes of acetic acid required removal of all but 125 ml. of acetic acid/100 g. rosin prior to crystallization for best results. The reactions described below were carried out using 100 g. ROS rosin, 16.3 g. maleic anhydride and 125 ml. of solvent at the start. The reactions were carried out at reflux for 22 hours, then allowed to cool at room temperature. The solutions were then seeded with crystals of maleopimaric acid and allowed to stand at room temperature overnight to crystallize. The product was filtered off on a Buchner funnel and washed with approximately 75 ml. of cold glacial acetic acid. With acetic acid containing 5 or 10% water, homogeneous reaction mixtures were obtained. At 15% water content, an additional 20 ml. of solvent had to be used to give a solution. At 20% water content, an additional 500 ml. of solvent was added but recovery was difficult.

In the reaction where the acetic acid contained 15% water, 100 ml. of glacial acetic acid was added when the reaction was over. The solution was then distilled to remove 120 ml. of solvent prior to crystallization. This procedure removed much of the water.

In the case of acetic acid containing 20% water, the non-homogeneous reaction mixture was concentrated by distilling off 500 ml. of solvent, thereby removing most of the water. Maleopimaric acid was crystallized from the resulting clear solution.

The results from the above experiments are summarized in the table below:

TABLE 6

| Experiment | Vol. of acetic acid, ml. | Percent water in acetic acid | Grams MPA obtained [a] | Wt. percent yield [b] | Mole percent yield [c] | Percent theoretical yield [d] |
|---|---|---|---|---|---|---|
| 1 | 125 | 5 | 38 | 33.0 | 25.0 | 47.3 |
| 2 | 125 | 10 | 37.5 | 32.6 | 24.7 | 46.7 |
| 3 | 145 | 15 | 35 | 30.4 | 23.0 | 43.5 |
| 4 | 625 | 20 | 20.5 | 17.8 | 13.5 | 25.5 |

[a] Air-dried acetic acid solvate.
[b] Grams unsolvated MPA/g. rosin.
[c] Mole MPA/mole rosin.
[d] Mole MPA/mole of abietic type acids in rosin.

DISCUSSION OF TABLE 6

(1) Acetic acid containing up to 10% water can be used in place of glacial acetic acid as a solvent for the reaction of rosin with maleic anhydride with only a slight decrease in yield of maleopimaric acid.

(2) Acetic acid containing 15% water can be used instead of glacial acetic acid, but a larger volume is required to give a homogeneous reaction mixture.

(3) Acetic acid containing 20% water does not dissolve the reactants when a large excess of the 20% aqueous acetic acid is employed. The yield of maleopimaric acid from such a reaction is much lower than expected.

(4) Yield of maleopimaric acid appears to decrease with increasing amount of water in the reaction mixture. This decrease is most significant for the case where 20% water was used.

PRODUCT USES

The pure maleopimaric acid is especially useful in the manufacture of high quality resins and as a coating aid for the gelatin coating of photographic films. The pure product of the present invention is obtained in substantially colorless form to make it far superior to the dark-colored, commercial products which are on the market today. Many of the most desirable uses of maleopimaric acid have not been realized in commercial practice because of the dark color. Examples of such uses are as a leveling agent in floor wax which must be light in color, as an addition agent in transparent alkyd and polyester vehicles and as a tackifying agent for light-colored neoprene.

What is claimed is:

1. A method for the preparation of maleopimaric acid comprising reacting maleic anhydride and rosin dissolved in acetic acid medium, containing 0% up to 20% water, the rosin being selected from the group consisting of tall oil rosin, gum rosin and wood rosin, at a temperature of at least 118° C. for a period of at least two hours whereby an adduct of maleic anhydride and levopimaric acid is formed as maleopimaric acid in a molecular complex in which 1 mole of maleopimaric acid and 1 mole of acetic acid make up the complex, adjusting the volume of the acetic acid medium to a value of about 75–100 ml. of acetic acid for each 100 grams of rosin by evaporating some of the acetic acid from said medium, crystallizing maleopimaric acid in the form of said complex and recovering maleopimaric acid by decomposing said complex.

2. A method as claimed in claim 1 wherein said molecular complex is heated under vacuum to remove acetic acid and recover pure maleopimaric acid.

3. A method as claimed in claim 1 wherein said acetic acid is glacial acetic acid and wherein said rosin is tall oil rosin.

4. A method as claimed in claim 1 wherein said acetic acid is glacial acetic acid and wherein said rosin is gum rosin.

5. A method as claimed in claim 1 wherein said glacial acetic acid is substantially anhydrous and wherein said rosin is wood rosin.

6. A method as claimed in claim 1 wherein said rosin is heated at 175–195° C. under a nitrogen atmosphere in an autoclave at a pressure of 150–200 p.s.i. for a period of about 2 hours.

7. A method as claimed in claim 1 wherein said rosin is heated at 118° C. at atmospheric pressure for a period of 8–11 hours.

References Cited

The Condensed Chemical Dictionary, pp. 6, 7 (1961).

LORRAINE A. WEINBERGER, Primary Examiner

R. GERSTL, Assistant Examiner